United States Patent [19]

Wiggerman

[11] Patent Number: 5,339,225
[45] Date of Patent: Aug. 16, 1994

[54] ILLUMINATED WAND

[76] Inventor: Ron Wiggerman, 100 Ronda Rd., McHenry, Ill. 60050

[21] Appl. No.: 14,641

[22] Filed: Feb. 8, 1993

[51] Int. Cl.$^5$ ............................................. B63B 45/00
[52] U.S. Cl. ..................... 362/61; 362/32; 362/235; 362/435; 362/326; 362/246; 362/311
[58] Field of Search ............... 362/83.3, 235, 249, 362/431, 32, 61, 340, 361, 35, 202, 208, 326, 246, 311, 335

[56] References Cited

U.S. PATENT DOCUMENTS

| | | | |
|---|---|---|---|
| 1,830,165 | 12/1927 | Gustin | 362/311 |
| 3,517,184 | 5/1967 | Norton et al. | 362/61 |
| 4,245,281 | 1/1981 | Ziaylek, Jr. | 362/61 |
| 4,375,634 | 3/1983 | Leis | 362/246 |
| 4,473,866 | 9/1984 | Davis | 362/61 |

*Primary Examiner*—James C. Yeung
*Assistant Examiner*—Sara Sachie Raab
*Attorney, Agent, or Firm*—Basil E. Demeur; Alan B. Samlan

[57] ABSTRACT

The invention herein is directed to an improved illuminated wand structure specifically intended as a boat stern running light, formed by a tubular wand member being elongated in configuration. The wand includes at least one light source positioned adjacent either the bottom end, and adapted to emit light upwardly, or positioned adjacent the top end and adapted to emit light in a downward direction. The tubular wand has a smooth outer wall and an inner wall provided with a light diffractive surface. Light emitted from either the upper or lower light source will be diffracted along the inner wall of the elongated wand thereby to illuminate the entire length of the wand. The wand may be provided with a light source at the bottom end and adapted to emit light upwardly, and a second light source positioned adjacent the top end to emit light in a downward direction where the wand is of a longer elongated configuration. A third light source is provided at the top end of the wand, which is enclosed by a lens globe and permits light to radiate therefrom. When illuminated, the upper light will radiate light in all directions while substantially the entire length of the elongated wand will be illuminated by the upper and lower light sources, or either of them.

2 Claims, 2 Drawing Sheets

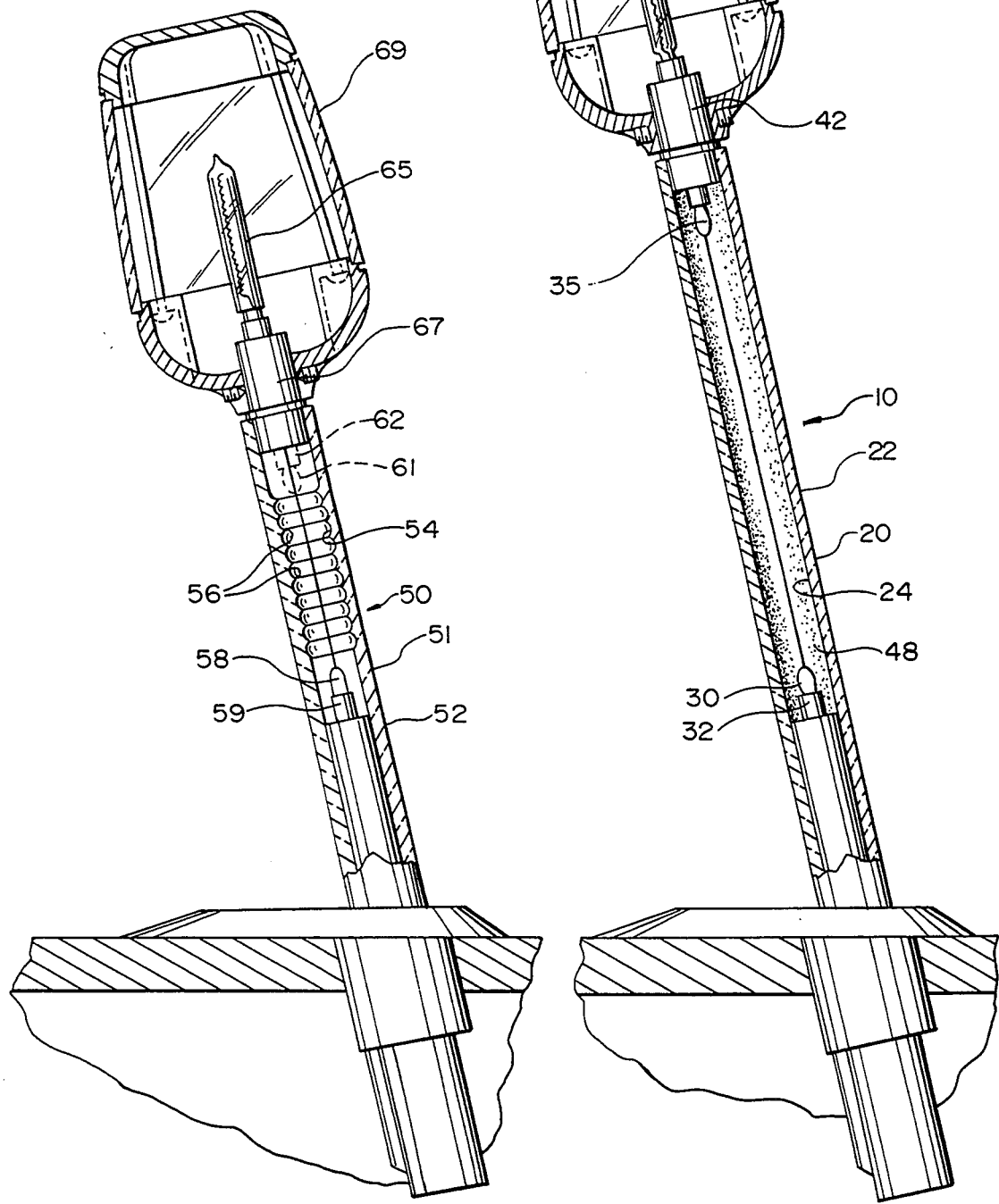

ILLUMINATED WAND

BACKGROUND OF THE INVENTION

The present invention relates to an improved boat stern running light in the form of an elongate wand which is illuminated from top to bottom for improved safety considerations.

The use of boat stern running lights is quite well-known in the art. The typical boat stern light which is common knowledge includes a pole type assembly wherein the pole is provided with a light source at the top end, while the lower end includes connection means for interconnecting with the power source of the boat. Such connection means generally includes a pair of terminal strips which are locked into touching contact with a pair of terminals which are in turn wired to the boat battery.

Over the years, many different versions of stern running lights have been developed. For example, U.S. Pat. No. 3,833,800 shows one form of a moveable pole light especially adapted for a boat which includes a horizontally slideable cover plate for covering the bore in the boat. The slideable cover plate covers the bore into which the pole is fitted when the pole is removed.

Various other patents have been issued for various assemblies of such pole lights, but typically, the prior art generally shows different means of attachment for the stern running light or stern pole to the boat. Typically, the stern lights are still designed as a pole member wherein the light is positioned on the top end of the pole, and the lower end of the pole adapted for power connection.

It has been determined, however, that at night, when a boat is moored in the water, any boat approaching shore can easily mistake a stern light for a light emanating from the shore line. For example, a boat moored approximately fifty feet from shore and simply anchored in the water, having its stern light in the on position, may not necessarily represent a boat in the water to another boater approaching from 200 to 300 yards off shore. Often it is found that the single light at the top of the pole simply blends in with the shore lights, and may easily be mistaken for nothing more than another light on shore. For this reason, many boat accidents have occurred due to boat collisions as a result of boaters mistakenly believing that a stern light is actually a light emanating from shore, and not necessarily a boat moored in the water.

No practical solution has been developed to overcome the safety problem referenced above. Hence, the present invention is intended as an improved stern running light which will afford to all boaters a more prominent display of a boat stern running light with a view toward avoiding boat collisions at night. Given the fact that a stern light is only used at night, it is believed that the present invention will greatly reduce, if not eliminate, such boating accidents.

OBJECTS AND ADVANTAGES

It is therefore the principal object of the present invention to provide a wand assembly specifically useful as a boat stern running light, which permits illumination of the substantial length of the stern running light, including what would be considered the pole section.

In conjunction with the foregoing object, it is an object of the present invention to provide an improved boat stern running light which is formed by a tubular wand having an elongate configuration with a top end and a lower end, the wand being formed of a material permitting light to radiate therefrom, the wand provided with a first light source positioned adjacent the lower end and adapted to emit light in an upward direction, and a second light source positioned adjacent the top end and adapted to emit light in a downward direction. The wand has a substantially smooth outer wall and an inner wall provided with a light diffractive surface, such that light emitted from the first and second light sources is emitted upwardly and downwardly respectively, and is diffracted along the length of the inner wall of the wand thereby radiating light along the substantial length of the wand when illuminated.

In conjunction with the foregoing object, it is yet another object of the present invention to provide an illuminated wand of the type described wherein the inner wall of the wand is formed by means of a series of threads formed in the surface of the inner wall, and extending along the entire length of the wall, the threads forming a light diffractive surface thereby to diffract light along the entire length of the wand and effectively radiate the light along substantially the entire length thereof.

As an alternate object of the present invention, the illuminated wand of the present invention may consist of a wand provided with an inner wall having a material coating formed thereon which has light diffractive characteristics such that light emitted from the first and second light sources will be diffracted along the length of the wand and effectively radiate light along the substantial length of the wand.

As a further alternate embodiment of the present invention, the illuminated wand may consist of a shorter elongate wand, wherein there is provided a single light source at either the top or the bottom of the wand and adapted to emit light in a downward or upward direction accordingly, such that the length of the wand will be illuminated by a single light source given the fact that the wand has an overall shorter elongate length.

Still a further object of the present invention is to provide a wand of the type described, which may further include a third light source mounted on the top end of the wand, the third light source being enclosed and surrounded by a lens which permits light to radiate therefrom, whereby upon illumination, the third light source provides an upper light which radiates outwardly, and the first and second light sources provide illumination for the substantial length of the wand thereby providing illumination from the bottom of the wand to the very top end thereof.

Further objects and advantages will be understood by reference to the attached drawings and the specification following below.

SUMMARY OF THE INVENTION

In summary, the present invention provides an improved illuminating wand structure which functions ideally as a boat stern running light. The improved illuminated wand of the present invention provides a safety standard for boaters by providing a stern light which is illuminated from the bottom thereof to the very top thereof and greatly reduces the possibility that the stern light will be mistaken, at night, for simply a light emanating from the shoreline.

The present invention provides an elongate wand which is provided with a first light source positioned adjacent the lower end and adapted to emit light in an upward direction, and a second light source positioned adjacent the top end and adapted to emit light in a downward direction. The inner wall of the wand is provided with a light diffractive surface such that light emanating from the first and second light sources is diffracted throughout the entire elongate length of the wand, and therefore, light will radiate outwardly from substantially the entire length of the wand.

As an additional feature, a third light source is provided at the top end of the wand, which is enclosed and surrounded by a lens assembly, and is adapted to emit light in all directions in the typical stern light application. Hence, once activated, the stern light of the present invention consisting of an illuminated wand, will be illuminated from the very bottom end thereof to the very top end thereof.

An alternate feature of the present invention is to provide an elongate wand having a shorter elongate length, and in such event, the light source for illuminating the entire wand may be positioned at either the top end of the wand pointing downwardly to emit light in a downward direction, or a light source positioned at the bottom of the wand and adapted to emit light upwardly such that the light emitted will diffract off the inner walls of the wand and illuminate substantially the entire wand. This version of the invention is intended to be adapted to wands of a shorter length, and hence, is adapted to either provide a boat stern running light, or a boat bow running light.

It is contemplated that the illuminated wand of the present invention is applicable in other applications, and hence, it is not intended to restrict the invention herein to a boat stern running light.

BRIEF DESCRIPTION OF DRAWINGS

FIG. 4 is a side elevational view, in cross-section, showing a wand having a shorter elongate configuration and a single light source positioned at the bottom end thereof, or as shown in phantom, may alternatively be positioned at the top of the wand facing downwardly.

FIG. 5 is a side elevational view, substantially in cross-section, showing a wand of the present invention wherein the inner wall of the elongate wand is provided with a coating which renders the inner wall of the elongate wand to be light diffractive.

DETAILED DESCRIPTION OF DRAWINGS

As shown in the present specification, the present invention is described in connection with its use as a boat stern running light. It will be understood, however, that the construction of the illuminated wand as described more fully hereinafter clearly has other applications, and the present invention is intended to cover such applications as may apply to the construction of the illuminated wand. As described herein, however, the invention will be described within the framework of a boat stern running light.

Figure 1:
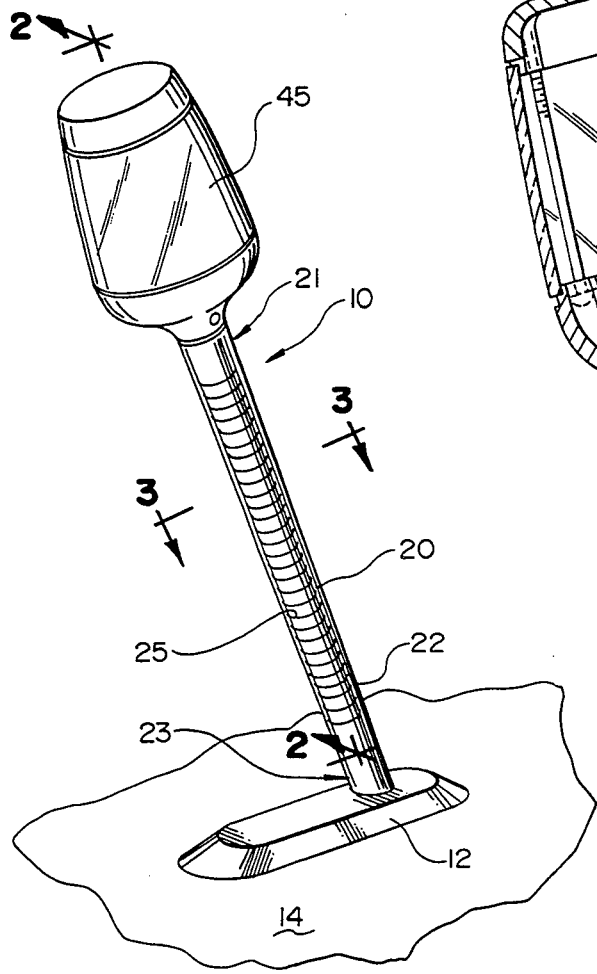
FIG. 1 is a side elevational perspective view showing the overall illuminated wand as a boat stern running light in accordance with the present invention.
Figure 2:
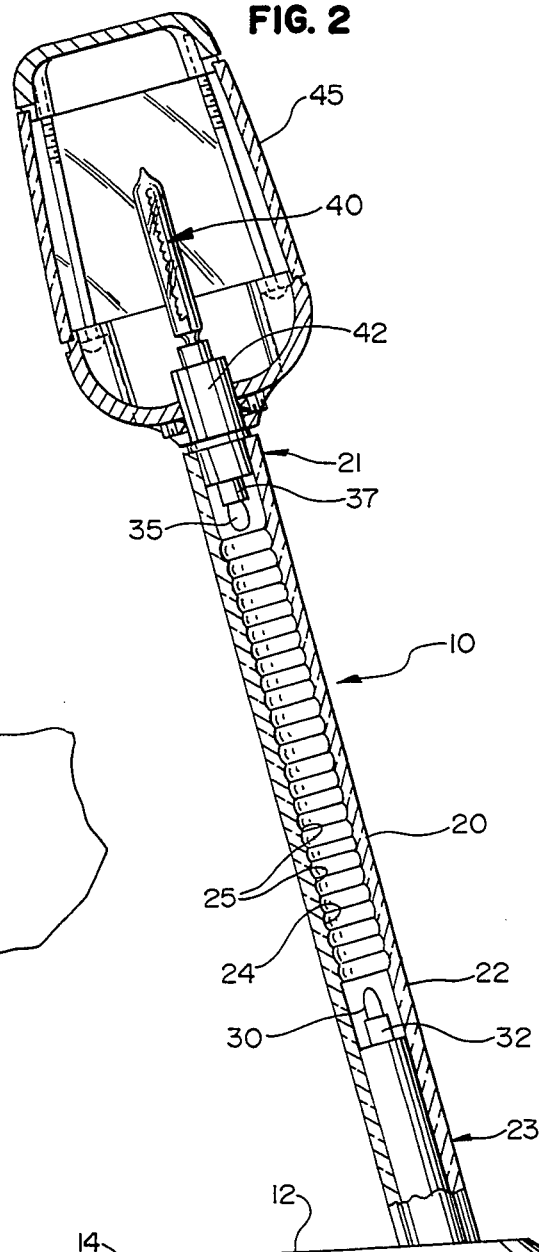
FIG. 2 is a side elevational view, in cross-section, showing the construction of the wand and the component parts thereof in accordance with the present invention, taken in the direction of the arrows along the line 2—2 of FIG. 1.

As shown in FIG. 1, the illuminated wand 10 of the present invention is illustrated. In the typical application, the wand 10 is shown to be mounted into an appropriate mounting bracket 12 which is, in turn, secured to the stern of a boat generally represented by the numeral 14. As shown in FIG. 2, the bracket 12 usually includes an internally extending collar 15 into which the wand 10 is secured by means of locking clips (not shown) to secure the wand 10 position on the boat. The collar 15 usually includes positive and negative terminals in the form of clips, (not shown), which mate with terminals formed on the bottom portion of the wand 10. As is well-known in the art, once the wand 10 is inserted into the bracket 12, the respective terminals on the wand 10 and the collar 15 come into contact, in order to provided power for the light source in the wand. This construction is considered prior art and is well-known to boating enthusiasts.

Again as shown in FIGS. 1 and 2 of the drawings, the wand 10 is shown to be formed by an elongate tubular wand member 20 which, in the preferred embodiment, is formed of a clear acrylic plastic or other plastic material which is capable of radiating, or otherwise permitting light to radiate outwardly through the material in order to be seen externally of the wand 10. The wand member 20 is formed with a smooth outer wall 22 and is provided with an inner wall 24 which is provided in turn, with a diffractive surface, generally represented by numeral 25. The embodiment as illustrated in FIGS. 1 and 2, the diffractive surface 25 is created by means of a plurality of threads represented by the numeral 25, which are cut into the interior surface of the wand member 20. It will be observed that the threads extend from a point adjacent the bottom end of the wand 23, to a point spaced downwardly from the top end of the wand 21.

The wand 10 of the present invention is shown to include the typical connection means (not shown) for mounting the wand 10 into the bracket 12 in the manner commonly known in the art.

A first light source 30 is provided adjacent the bottom of the wand 23 and is shown to be mounted in an appropriate light socket 32 which, will be understood to be electrically connected to the terminals located at the bottom portion of the wand 10 in the manner heretofore indicated. It will be observed that the light 30 is mounted such that it is pointed upwardly and will have a tendency to emit light in an upward direction. A second light 35 is shown to be mounted in appropriate light socket 37 adjacent the top of the wand 21. The second light 35 is shown to be mounted in the light socket 37 and positioned in a downward direction such that light emitted therefrom will be emitted in a downward direction into the body of the wand 20. Once again, both the first light 30 and the second light 35 are electrically interconnected such that upon the mounting of the tubular wand member 20 into the bracket 12, electrical contact is made between the respective terminals, and both lights 30 and 35 will be activated.

It has been found that with the configuration as described herein, light being emitted from the first light 30 as well as the second light 35 will be emitted down the length of the tubular wand member 20, and due to the diffractive surface 25 of the inner wall 24, the entire wand member 20, or a substantial portion thereof, will be illuminated from the top end 21 to the bottom end 23.

This occurs due to the fact that the light waves as emitted from the respective lights 30 and 35 are diffracted along the entire length of the wand 10 and will therefore radiate light outwardly throughout the entire length thereof.

As further shown in FIGS. 1 and 2, the illuminated wand 10 may also include a third upper light 40 which is again mounted in an appropriate light socket 42. The upper light 40 is surrounded by an appropriate lens structure, generally represented by the numeral 45, which is designed to permit light to radiate outwardly in all directions from the upper light 40. It is contemplated that the construction of the upper light 40 assembly, including the lens structure 45 is constructed in a manner typical with the prior art type stern running lights of the pole type variety. It will be appreciated that a third upper light 40 and the socket 42 into which it is mounted, is again electrically interconnected with the terminals which are positioned at the bottom of the wand 10 in conjunction with the terminals located in the collar 15 of the mounting bracket 12. Hence, once the illuminated wand 10 is mounted onto the bracket 12 of the boat, and electrical contact is achieved, all three light sources will be illuminated.

It is also contemplated in accordance with the present invention that the inner wall 24 of the wand 10 may, as opposed to having a plurality of threads 25 formed therein in order to form the diffractive surface, be provided with a coating of a chemical material, or have a roughened surface which has diffractive characteristic with respect to light. FIG. 5 illustrates this version of the elongate wand of the present invention and will be more fully described hereinbelow.

Figure 3:
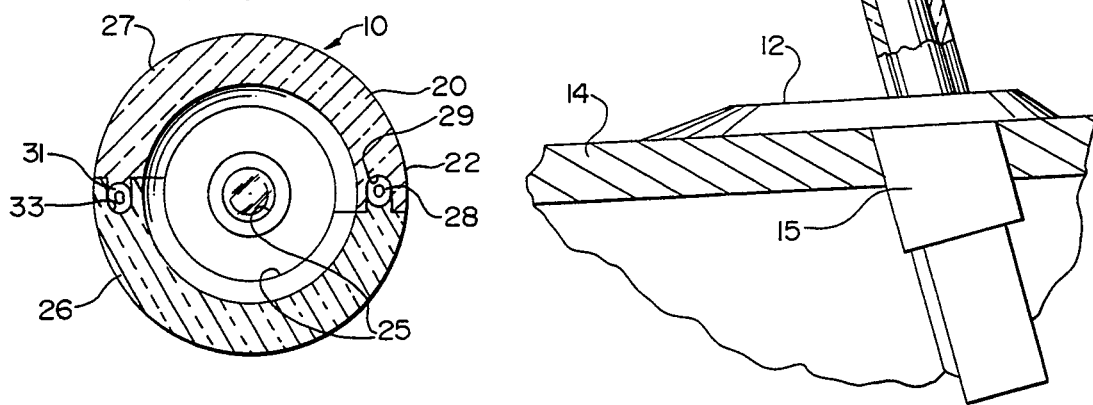
FIG. 3 is a top cross-sectional view of the subject wand taken along the line 3—3 in the direction of the arrows as shown in FIG. 1.

As illustrated in FIG. 3 of the drawings, the wand 20 may be formed of two half sections represented by the numerals 26 and 27 respectively. It is contemplated that from the standpoint of manufacturing, it may be more efficient to form the tubular wand member 20 from two half sections in order form the threads 25 therein. In such an event, the half sections would be manufactured and formed with the threads formed into the inner wall 24 of the wand 20, and then the two half sections 26 and 27 respectively secured together. As shown in FIG. 3, the means of securement may consist of an elongated nib 28 formed in one edge of the half section 26, and a corresponding elongated nib 31 formed in one edge of the other half section 27. In such a construction, the opposed edge of each of the half sections 26 and 27 respectively would be formed with the elongated lock slots 29 and 33 respectively. Hence, the two half sections 26 and 27, once formed with the threads therein, may be snap fitted together by lockingly engaging the respective nibs 28 and 31 in the lock slots 29 and 33.

The above construction merely represents a convenient method of manufacturing the illuminated wand since it is deemed to be perhaps easier and less expensive to create the wand from two half sections, afterwhich the two half sections may be interconnected rather than bearing the expense of attempting to turn a tubular member in order to create threads along the inner wall and along the entire length thereof. However, the particular means of forming the illuminated wand are not considered critical to the present invention, and it is not intended to limit the present application to such a construction in terms of half sections, as opposed to a formed tubular wand member which may be turned along the inner wall by an appropriate tool.

As previously indicated, FIG. 5 illustrates another embodiment of the present invention wherein the tubular wand member 20 is provided with a smooth outer wall 22, and an inner wall 24. For sake of convenience, the numbering used for FIG. 5 will be similar to the numbering system used in FIGS. 1 through 3 with the exception of the alternate elements disclosed therein.

As shown in FIG. 5, the inner wall 24 of the wand 20 is shown to have a roughened surface 48 which may be formed either by the application of a chemical coating which renders the inner wall 24 in a roughened condition, or may be accomplished by sandblasting the inner wall 24 incident to the manufacturing procedure. In such an event, the sandblasting would have the effect of cutting into the inner wall 24, and result in a roughened surface. In such event, the lower light 30 which is directed in an upward condition will emit light in an upward direction, while the upper light 35 will emit light in a downwardly direction, all of the light being diffracted along the entire inner wall 24 of the wand 20. It is contemplated that the wand as disclosed in FIG. 5 would similarly be provided with a third light source or upper light 40 which is mounted in a light socket 42, and enclosed by a lens structure 45. Hence, it is contemplated that the embodiment as shown in FIG. 5 is within the scope of the present invention in that the inner wall 24 of the wand 20 has alight diffractive surface to accomplish the objects and advantages associated with the present invention.

As shown in FIG. 4 of the drawings, an alternate embodiment of the present invention is illustrated. There is disclosed an illuminated wand 50 which is formed by a wand member 51, having a smooth outer wall 52, and an inner wall 54. In this instance, the elongated wand is of a shorter length, and hence, can function as either a boat stern light, or alternatively, even as a bow light for a boat. As shown therein, the inner wall 54 includes a series of threads 56 which extend the length of the inner wall 54, thereby to create a diffractive surface for the inner wall 54. This embodiment is similar to that shown in FIG. 2 of the drawings excepting only for the overall length of the wand 50.

In this embodiment, it has been found that a single light source may be positioned either at the bottom of the wand as illustrated by the numeral 58 which consists of a light plugged into a socket 59, and positioned to emit light upwardly. The light so emitted will be diffracted along the shortened length of the wand 50 and illuminate substantially the entire shorter length of the wand.

Alternatively, and as shown in phantom, the light may be positioned at the top end of the wand, such as light 61 which is disposed in a light socket 62. In this instance, the light may be positioned in a downward direction in order to illuminate the entire length of the wand. It is contemplated, however, that due to the shortened length of the wand, a single light source would operate efficiently in order to illuminate the entire length of the wand 50. As contemplated with prior embodiments an upper light 65 which is connected to sockets 67 and surrounded by lens structure 69 to illuminate the upper part of the wand as is commonly known and as previously described.

In all respects, it is contemplated that the wand assembly as shown in FIG. 4 will operate as efficiently as the wand structure described with respect to FIGS. 1 through 3 and 5 of the drawings in view of the fact that the shorter length of the wand will accommodate and be illuminated by a single light source thereby minimizing manufacturing time and expense. It is also noteworthy that the wand structure as shown in FIG. 4 may be created with a light diffractive surface in the same manner as the wand shown in FIG. 5, that is by applying a chemical coating or otherwise sandblasting the inner wall of the wand in order to create a light diffractive surface.

It will be appreciated from the above description, that the illuminated wand of the present invention, once installed into the mounting bracket at either the stern or bow end of the boat, and a power source energized, the lights contained within the illuminated wand will emit light, and in fact illuminate the entire length of the wand due to the diffractive characteristics of the inner wall of the wand member. As indicated, the wand may be created with either an upper and lower light source to illuminate the length of the wand, or in the case of a shorter wand, may be provided with a single light source at either the upper or lower end thereof such that the entire length of the wand is illuminated. The upper light may be provided in the same manner as boat running lights presently existing. It will be appreciated, however, that by providing a totally illuminated wand, an approaching boat may more readily distinguish the running lights of the boat as opposed to believing that the stern or bow running light is a single light source appearing as part of the shoreline lights. Hence, it is believed that the illuminated wand of the present invention provides a safety margin not heretofore achieved with other similar types of stern and bow lights.

It will also be appreciated that the illuminated wand of the present invention may have other applications in other fields beyond the use as a stern running light for boats. It is intended to cover within the scope of the present invention any such applications wherein it is deemed desirable to have an illuminated elongate structure for safety or other purposes.

While there has been described what is at present considered the preferred embodiments of the invention, it will be understood that various modifications may be made therein and that such variations and modifications are intended to be covered by the claims as set forth hereinafter.

I claim:

1. An illuminated wand for use as a boat stern running light comprising,
    a tubular wand having an elongate configuration with a top end and a lower end,
    said wand being formed of a material permitting light to radiate therefrom,
    said wand provided with a first light source positioned adjacent the lower end of said wand and adapted to emit light in an upward direction, and a second light source positioned adjacent the top end thereof, and adapted to emit light in a downward direction,
    a third light source mounted at the top end of said wand and adapted to emit light in an upward and outward direction therefrom,
    said wand having a substantially smooth outer wall and having an inner wall provided with a light diffractive surface,
    said lower end of said wand having connection means associated therewith for permitting the connection of said wand to a power source for providing power to said first, second and third light sources,
    whereby said wand may be mounted onto a boat stern and function as a boat stern running light, having an upper illuminated light, and wherein the length of said wand is further illuminated to form a running light illuminated substantially from top to bottom.

2. The illuminated wand as set forth in claim 1 above, wherein said third light source is enclosed and surrounded by a lens structure which permits light to radiate therefrom,
    whereby said wand forms a boat stern running light having an upper illuminated light and wherein the length of said wand is further illuminated to form a running light illuminated from top to bottom.

* * * * *